United States Patent [19]
Stoll et al.

[11] Patent Number: 5,929,536
[45] Date of Patent: Jul. 27, 1999

[54] CONTROL DEVICE, MORE ESPECIALLY FOR ACTUATING VALVES

[75] Inventors: Kurt Stoll, Esslingen; Stefan-Johannes Demuth, Benningen; Magnus Henzler, Grossbettlingen, all of Germany

[73] Assignee: Festo KG, Esslingen, Germany

[21] Appl. No.: 08/849,271

[22] PCT Filed: Sep. 29, 1995

[86] PCT No.: PCT/EP95/03854

§ 371 Date: May 28, 1997

§ 102(e) Date: May 28, 1997

[87] PCT Pub. No.: WO96/19027

PCT Pub. Date: Jun. 20, 1996

[30] Foreign Application Priority Data

Dec. 10, 1994 [DE] Germany .............................. 44 44 024

[51] Int. Cl.$^6$ ...................................................... H02J 1/00
[52] U.S. Cl. ............................ 307/38; 307/42; 307/139; 307/147
[58] Field of Search ................................. 307/31, 32, 33, 307/34, 38, 39, 42, 125, 112, 139, 140, 144, 147

[56] References Cited

U.S. PATENT DOCUMENTS

| | | |
|---|---|---|
| 4,245,319 | 1/1981 | Hedges ..................................... 364/493 |
| 4,471,232 | 9/1984 | Peddie et al. .............................. 307/35 |
| 4,694,192 | 9/1987 | Payne et al. .............................. 307/39 |
| 5,191,520 | 3/1993 | Eckersley ................................... 363/72 |
| 5,345,225 | 9/1994 | Davis ...................................... 340/635 |
| 5,384,490 | 1/1995 | Swartz, Jr. ................................ 307/38 |
| 5,586,271 | 12/1996 | Parrett ..................................... 395/283 |

FOREIGN PATENT DOCUMENTS

| | | |
|---|---|---|
| A-2624627 | 6/1989 | France . |
| U-9214301 | 2/1993 | Germany . |
| A-4312729 | 10/1994 | Germany . |
| A-683021 | 12/1993 | Switzerland . |
| A-9424748 | 10/1994 | WIPO . |

*Primary Examiner*—Jeffrey Gaffin
*Assistant Examiner*—Jonathan S. Kaplan
*Attorney, Agent, or Firm*—Hoffman & Baron, LLP

[57] ABSTRACT

A control device is proposed for employment in the transfer of control signals between a field bus (2) and at least one load (5). It comprises a control module (23), which possesses a bus communication unit (24) able to be connected with the field bus (2) and which is so able to be attached to a load (5) that a contact means (27) provided thereon is coupled with such load (5). On the control module (23) in addition to the contact means (27) at least one additional signal input (35) and/or signal output (33) is provided which is connected with the bus communication unit (24) for coupling up at least one further load (5') and/or sensor.

17 Claims, 3 Drawing Sheets

CONTROL DEVICE, MORE ESPECIALLY FOR ACTUATING VALVES

The invention relates to a control device for employment in the transfer of control signals between a field bus and at least one load and/or a sensor, more particularly for driving valves, comprising a control module, which possesses a bus communication unit and connection means serving for the connection thereof with the field bus and may be so connected with at least one load and/or a sensor that its bus communication unit is electrically coupled with the load and/or the sensor by way of a contact means provided on the control module.

A control device of this type is disclosed in the German patent publication 3,915,456 A1. It is employed for individually driving electromagnetic valve in a group of valves. The individual valves are connected by way of valve plugs with the serial field bus, a bus communication unit being integrated in each valve plug so that each valve is provided with such a bus communication unit of its own. The bus communication units read the signal transmitted by the field bus and, in the case of a relevant addressing thereof, switch the associated valve.

While the known control device is able to be utilized in a relatively adaptable fashion, the large number of bus communication units does in fact lead to a relatively expensive design. Furthermore, the laying of the field bus conductors is relatively elaborate, since each load must have the conductors laid separately to it.

A similar arrangement, in which the bus communication units are however integrated in the valve drives is disclosed in the German patent publication 4,230,414 A1.

One object of the present invention is to create a control device of the sort noted initially, which renders possible not only simple installation but furthermore a low-cost manner of construction.

In order to attain this aim there is a provision such that in addition to the contact means on the control module and connected with the bus communication unit at least one signal input and/or signal output is provided for the coupling up of at least one further load and/or sensor.

It is thus possible to utilize the control module arranged on the one load or sensor simultaneously for coupling further loads and/or sensors, with which accordingly no further additional separate bus communication unit must be associated. The control module with the bus communication unit may consequently be the central bus station simultaneously for a plurality of loads and/or sensors. Without any substantial reduction in adaptability the designer therefore achieves a decrease in costs of manufacture. If in the case of the control module it is a question of as plug part, same may, in an appropriate case of application, be employed as a valve plug, the further loads and/or sensors present being able to be connected with this valve plug so that same may communicate by way of its central bus communication unit, associated with a group of the loads and/or sensors, with the field bus. Since in this case it is unnecessary to extend the field bus conductors as far as all loads and/or sensors present, the complexity of installation is furthermore reduced.

The field bus is preferably a serial bus with a so-called twin conductor design. It is convenient if the field bus is in accordance with the so-called ASI specification, the bus communication unit also being in the form of a correspondingly designed ASI bus station.

Further advantageous developments of the invention are defined in the dependent claims.

The signal inputs and/or signal outputs present on the control module are preferably connected by way of electrical conductors with external connection parts, same being able to be connected with the loads and/or sensors to be included in the circuit. First class adaptability is inherently possible with a design, in which the electrical conductors are in the form of cables. For particular applications there may however also be a provision such that one or more of the connection parts present are rigidly connected with the control module so that during assembly of the control module it is simultaneously possible to couple up the respective connection part with the associated load and/or sensor.

Between the electrical conductors and the signal inputs or, respectively, signal outputs permanent wiring is possible. In order for instance to render possible a selective connection of electrical conductors with different lengths it is however also possible to provide a releasable connection, which is preferably constituted by a plug coupling means.

In the case of a preferred embodiment the control module is installed on a load and in addition to the contact means employed here the only signal outputs are signal outputs, which are connected with further loads. Such an arrangement is more particularly employed in connection with valve assemblies.

The control module may, in accordance with a further preferred design, have its contact means directly mounted on a sensor, there otherwise only being signal outputs present, same communicating with further sensors. The sensor signals are in this case supplied to the bus communication unit, which passes them on to the field bus connected therewith following respective interrogation.

In the form of realization presently considered to be best in addition to the contact means, which in accordance with the site of the control module constitutes a signal output or a signal input, three further signal inputs and/or signal outputs are present so that all in all four possibilities of connection exist. A particularly compact unit is one in which the control module is mounted on a first load, a further signal output is in communication with a further load and moreover two further loads are present, which are connected with sensors, which for their part are installed on a drive means, as for instance on a linear drive. During operation of the drive means sensor signals are produced, which are employed for driving the two loads, which for their part may control a valve arrangement presetting operation of the drive means.

In what follows the invention will be described in more detail with reference to the accompanying drawings.

Figure 1:
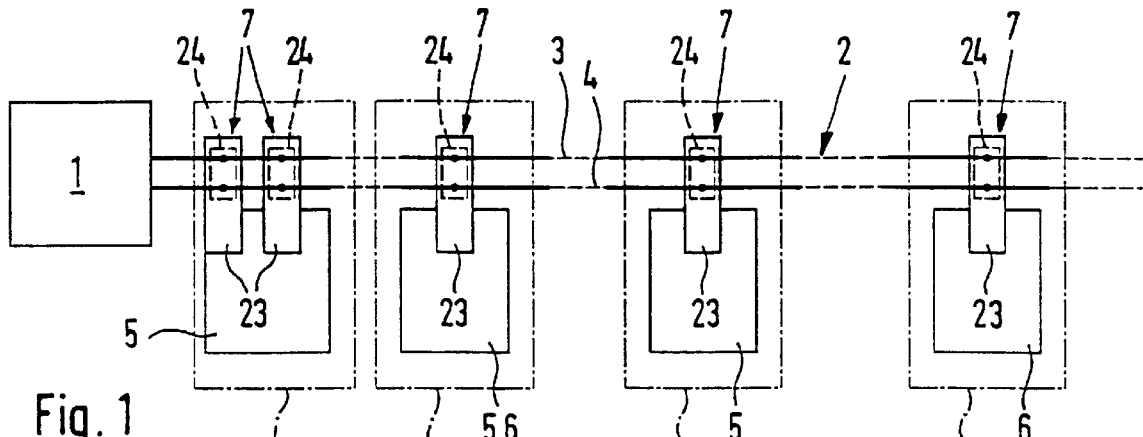
FIG. 1 shows an arrangement with a plurality of control means of the type in accordance with the invention switchingly connected with a field bus connection system, different units of the arrangement being marked in chained conductors which are connected with differently designed control means, which are illustrated in detail in the further figures.

It is to be noted as a preliminary that the different units present in the arrangement of FIG. 1 may be employed in any desired combination. The multiplicity of possible forms serve in the instant case for explanation of the wide range of possible designs of the control means.

In FIG. 1 an arrangement or device is illustrated as is employed for example for the control of a machine able to be used in assembly or manufacturing technology. A central control unit 1 is present, which contains a control program, by way of which the manner of operation of the individual components of the arrangement is controlled. Preferably it is a question of a memory programmable control (SPS).

A field bus 2 is connected with the central control unit 1. The field bus 2 is in the instant case in accordance with the so-called ASI specification. It is a question of a twin conductor bus or, respectively, twin wire bus, comprising two wire-like conductors 3 and 4. In the instant case it may be a question of separate conductors or however of conductors integrated in a common insulated cable. Transmission of the control signals best takes place in serial mode.

Along the field bus 2 a plurality of units II, IV, V and VI is connected, which respectively comprise one or more loads 5 and/or one or more sensors 6 (see FIGS. 2 through 7). Using the field bus 2 by the central control unit 1 the loads 5 are supplied with certain control signals, which cause the loads 5 to perform specific actions. In contradistinction to this the central control unit 1 receives control signals, stemming from the sensors 6 and transmitted by way of the field bus 2, which affect the form of signal output. Thus the invention provides an integrated control system.

The control means 7 of the invention is used with advantage in connection with the transmission of control signals between the field bus 2 at least one load and/or sensor. It is consequently suitable for signal transmission in both directions of transfer. Preferred embodiments are indicated in FIGS. 2 through 7. Firstly reference will be had to the embodiment of FIGS. 2 and 3. Here a valve subassembly 8 is illustrated, which comprises a plurality of control valves 12 arranged with their longitudinal sides adjacent and in sequence. In the embodiment four control valves 12 are present. The control valves 12 are attached to a plate- or rail-like fluid distributor 13.

Said fluid distributor 13 has a plurality of fluid ducts 14 extending through it longitudinally. They open in a familiar manner in a standard pattern on the component mounting face of the fluid distributor 13, on which the control valves 12 are seated. By way of one or more of the fluid ducts 14 a central supply of pressure medium is ensured, whereas other fluid ducts 14 may serve for conducting spent air, and further fluid ducts 14 may be for pilot pressure medium. The structure may for instance be as in the German patent publication 4,230,414 A1.

Figure 4:
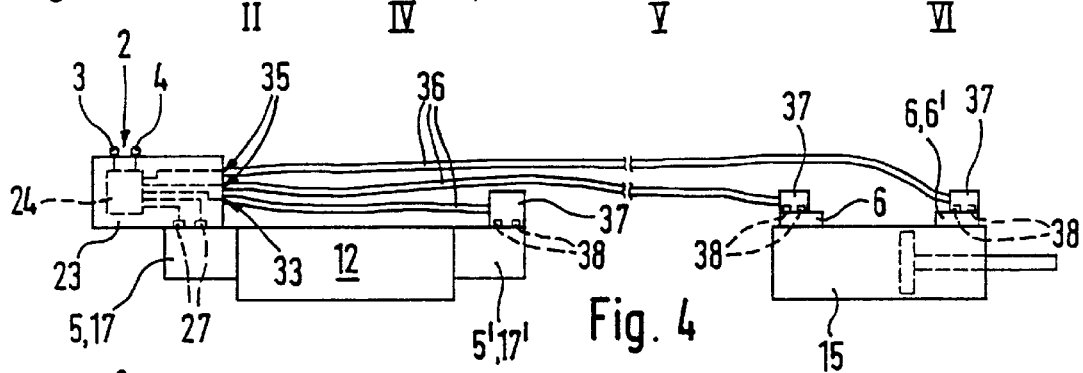
FIG. 4 shows the unit IV marked in FIG. 1 in a detailed view thereof.
Figure 6:
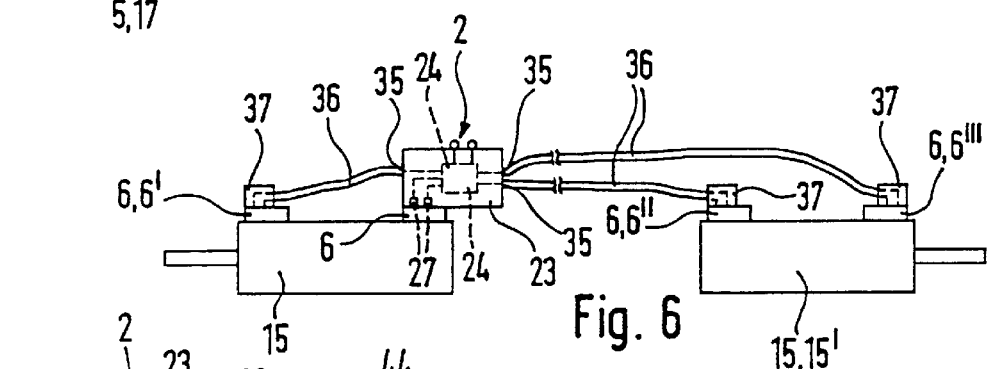
FIG. 6 shows the unit VI marked in FIG. 1 in a detailed plan view.

The control valve 12 control the supply and removal pressure medium, more particularly a pneumatic one, to and from any desired form of fluid power units 15, as are represented as examples in FIGS. 4 and 6. In this respect it is a question, for example, of fluid operated linear drives or, respectively, fluid power cylinders. The control valves 12 possess openings 16, with which pressure medium conductors, not illustrated in the drawing, may be connected leading to the fluid power units. Control of the direction of flow of the pressure medium and consequently the operational characteristics of the fluid power unit, which is connected, is ensured by the respective setting of the valve spool arranged in the control valves 12.

The respective position of switching of the spool of any respective control valve 12 is set by one or more electrically actuated valve drives 17. The control valve illustrated in FIGS. 2 and 3 each possess two valve drives 17, which for instance are mounted adjacent to the respectively opposite end faces of the control valve 12. The valve drives 17 of the embodiment of the invention are electromagnetic or solenoid devices, which in a known fashion comprise, a electromagnet winding and a moving armature 22. Electrical control pulses supplied to the electromagnet winding 18 control the position of the magnet's armature 22 and accordingly the supply to the valve spool of pressure medium for the pilot ducts 14. Dependent on the selected supply of pressure medium a predetermined switching setting of the valve spool is set.

In the case of the embodiments illustrated the above mentioned loads 5 are constituted by the valve drives 17.

Figure 2:
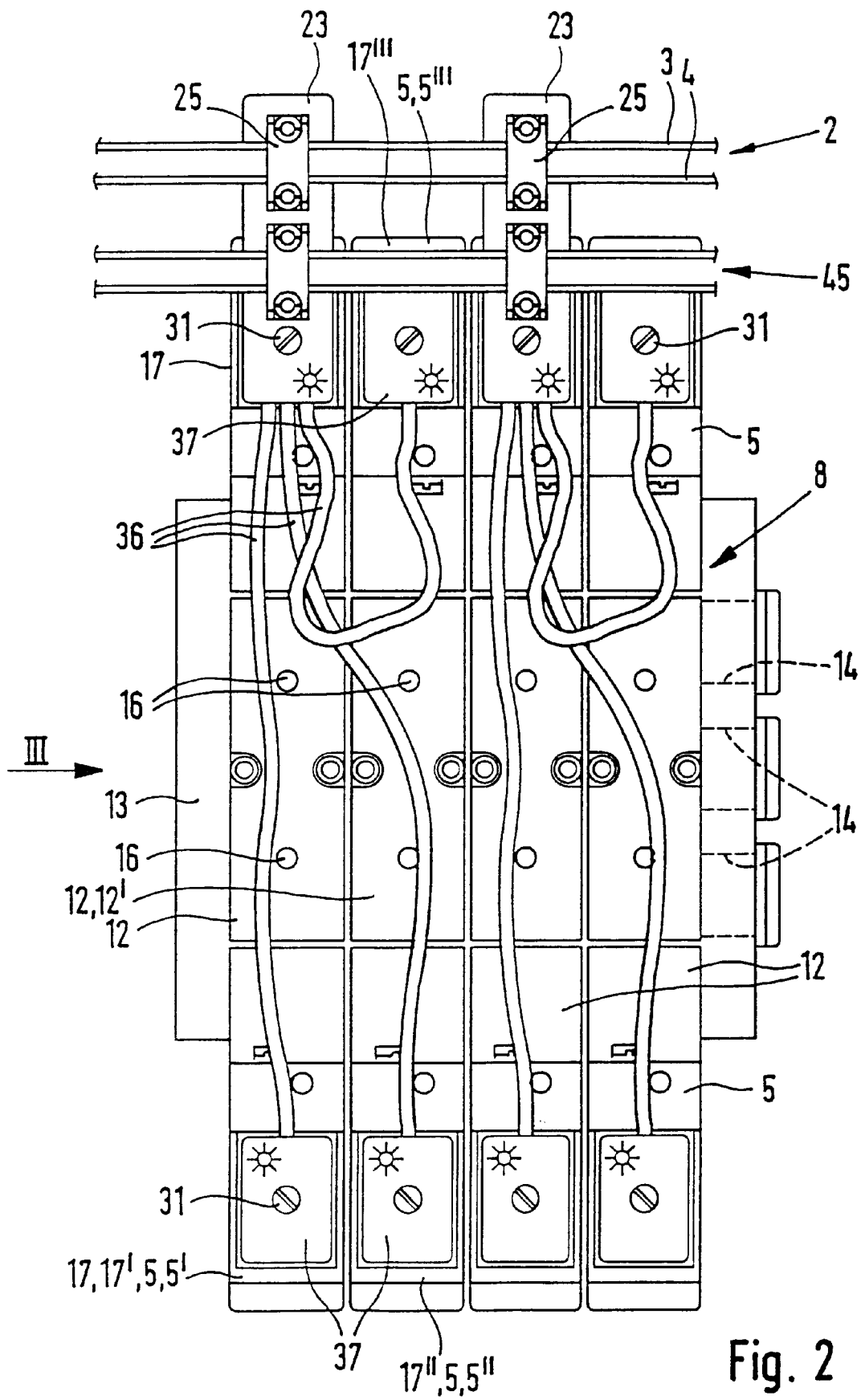
FIG. 2 shows the unit II, marked in FIG. 1, in a detailed plan view.
Figure 3:
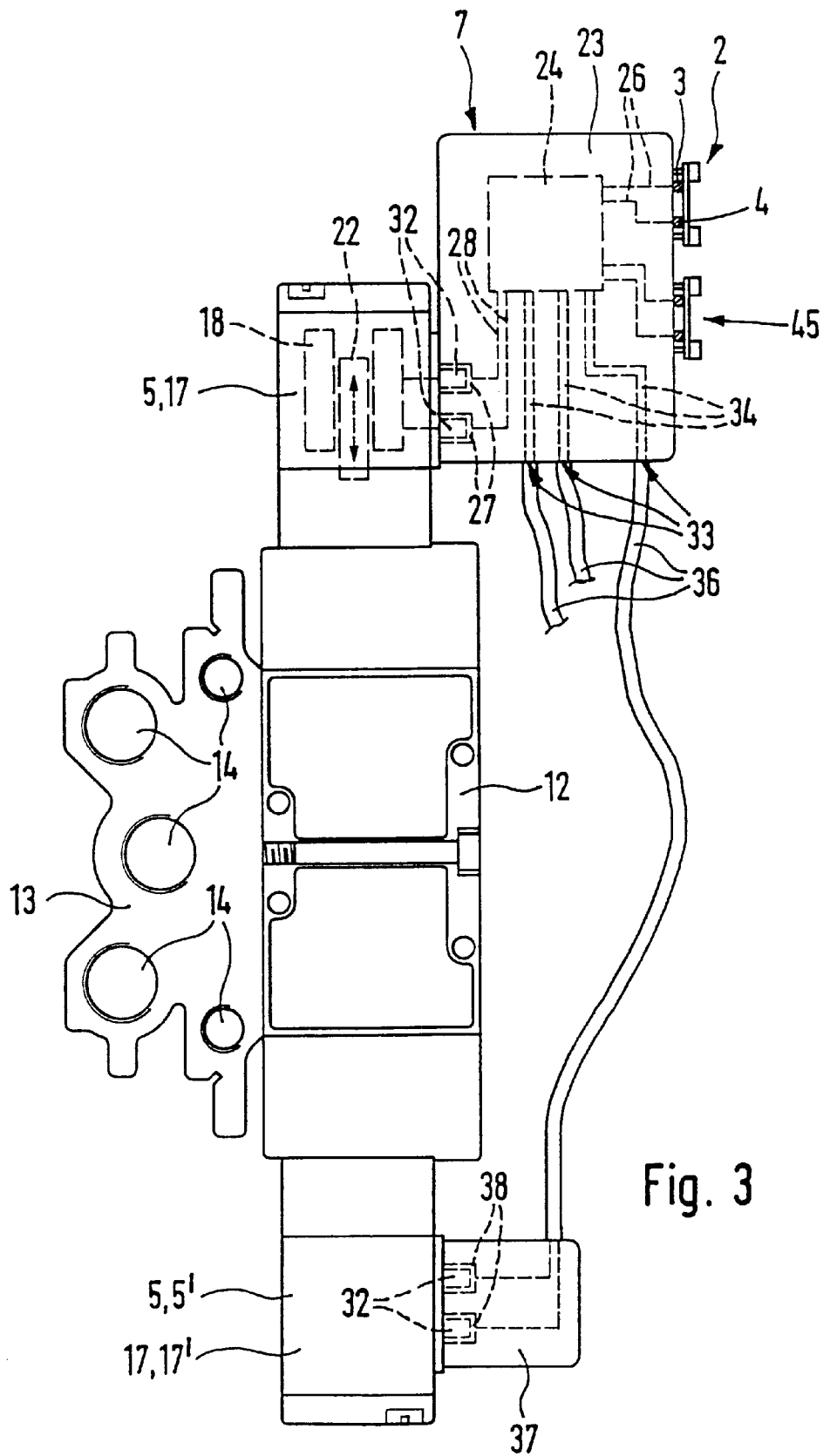
FIG. 3 shows the arrangement of FIG. 2 in a side view looking in the direction of the arrow III.

The control device 7 in accordance with FIGS. 2 and 3 comprises a preferably block-like control module 23. In the interior of the control module 23 a bus communication unit 24 is located, which in the instant case is designed in the form of an ASI bus station. On one outer side of the control module 23 connection means 25 of a suitable type is provided, which renders possible detachable connection of the conductors 3 and 4 of the field bus 2. The connected conductors 3 and 4 are electrically connected by way of first internal conductors 26 with the bus communication unit 24. At another point adjacent to the outer side of the control module 23 there is an electrical contact means 27. By way of second internal conductors 28 same as well is put in communication with the bus communication unit 24.

The control module 23 is directly mounted on one of the valve drives 17. The attachment screw therefor is indicated at 31. The electrical contact means 27 is here electrically connected with contact means 32 provided on the associated valve drive 17, such means being connected via internal conductors of the valve drive 17 with the magnet winding 18 thereof.

It is in this manner that the bus communication unit 24 is placed in the electrical connection between the field bus 2 and the load 5.

During operation of the arrangement the bus communication unit 24 reads the signals fed by the field bus 2. When a control signal addressed to the respective bus communication unit 24 arrives, the bus communication unit 24 causes the respective action to be performed, as for example the attraction of the magnet armature 22 for the displacement of the valve member. It is an advantage here that the control member 23 not only possesses the contact means 27 as a signal output. There are in addition further signal outputs 33 provided on the control module 23. The control module 23 in the example possesses three such additional signal outputs 33 so that, if one includes the electrical mold cavity means 27, the control module 23 is in all provided with four signal outputs.

The three additional signal outputs 33 are connected independently of each other by way of electrically third internal conductors 34 with the bus communication unit 24. Furthermore, each of these additional signal outputs 33 is electrically connected with a further load 5, 5', 5" and 5'". In this respect it is again a question of valve drives 17', 17' and 17'".

The one valve drive 17' is mounted on the same control valve 12 as the first valve drive 17, which bears the control module 23. The two other valve drives 17" and 17'" are in the present case located in a similar fashion on one of the other control valves 12'. It is in this manner that the control module 23 is simultaneously responsible for the control a plurality of valve drives 17 and furthermore a plurality of control valves 12.

The control signals arriving from the central control unit 1 by way of the field bus 2 and addressed to the associated bus communication unit 24 possess the information necessary for activation of the connected loads 5, 5', 5" and 5'". Such information is processed by the bus communication unit 24 and actuation of the connected loads takes place accordingly.

In this case an important point is that a plurality of loads 5 possess a common bus communication unit 24 associated with them, the unit 24 being located in a control module 23, which for its part is directly mounted on one of the loads 17.

A similar arrangement is also possible in combination with sensors, something which is well illustrated in FIG. 6. It will be seen here that there are two of the above mentioned fluid power units 15, on each of which a sensor 6 is mounted, and which respond to a certain position of a piston arranged in the fluid power units 15.

In the instant example the sensors 6 are so-called reed sensors, but it would be equally possible to have sensors of some different type, as for example inductive, magnetoresistive or magnetostrictive sensors. Herein the term "sensor" is employed to include any means, by which an operational parameter is measured.

The control module 23 is mounted on one of the sensors 6. The electrical contact means 27 provided thereon is connected with the sensor means in the interior of sensor 6 electrically. In this case the electrical contact means 27 constitutes a one signal input, since signals from the sensor 6 are supplied via it, such signals being transmitted by the bus communication unit 24 to the field bus 2 if the unit 24 is suitably set, such signals passing from the field bus 2 to the central control unit 1.

Here the control module 23 possesses three further signal inputs 35 in addition. Each of these signal inputs 35 is connected with a further sensor 6', 6" and 6'". The one sensor 6' is located on the same fluid power unit 15 as the sensor 6 bearing the control module 23. The two other connected sensors 6" and 6'" are located on at least one further fluid power unit 15'. Accordingly the control signals of a plurality of mutually independent sensors arrive at the bus communication unit 24 and are then supplied by way of the field bus 2 to the central control unit 1.

FIG. 4 shows a hybrid arrangement, in the case of both signal inputs and also signal outputs are present on the control module 23. The control module 23 is mounted on a load 5 so that the contact means 27 functions as a signal output. By way of a further signal output 33 a second load 5' is connected which is in the form of a further valve drive 17'. Furthermore, two further signal inputs 35 are present, which are connected with two sensors 6 and 6', which are arranged on the fluid power unit 15.

It would of course also be possible to place a control module 23 with a hybrid arrangement of signal inputs and signal outputs directly on a sensor, to and from which a further sensor and a further load are connected and, respectively, driven.

The overall number of four items, each signal output 33 and each signal input 35 counting as one item, has proved to be particularly advantageous, because despite a low degree of complexity the system is particularly adaptable. However it would be feasible to provide a different overall number of items, the numerical relationship between signal outputs and signal inputs being varied in accordance with requirements.

In the case of the unit II depicted in FIGS. 2 and 3 the control valves 12 are connected in pairs with a common control module 23. In the case of the number of four control valves 12 selected, two control modules 23 are consequently present.

The electrical connection between the further signal outputs 33 or signal inputs 35 present on the control module 23 with the respectively associated load 5 or sensor 6 is best provided by flexible electrical conductors 36. In the illustrated working embodiment it is a question of cables with one or more internal cores, which are surrounded by an insulating casing. Cables of this type are extremely low in price and may be cut to the appropriate lengths by the user of the equipment without any difficulty. At the load or, respectively, sensor end of the electrical conductors 36 there is preferably in each case a respective connection part 37. This connection part 37 is detachably applied to the respective load 5 or, respectively, sensor 6. A contact arrangement 38 arranged thereon is electrically connected (in a condition set on the load 5 or, respectively, sensor 6) with the contact means 32 provided on same, which for their part are connected with the internal means of the associated load or sensor.

Accordingly the control means 7 illustrated in FIGS. 2 through 4 may be extremely simply mounted and dismounted in accordance with requirements. Apart for the connection of the field bus 2 it is merely necessary to provide the control module 23 and the three connection parts 37.

In order to facilitate such connection operation both the control module 23 and also connection parts 37 are preferably designed in the form of plug parts. Attachment or mounting is consequently a plugging operation. The electrical contact means 27, the electrical contact arrangement 38 and furthermore the contact means 32 are in this case in the form of plug contacts, which may be combined together as multiple plug connectors or, respectively, multipole plug connections.

As was the case with the control module 23 it is also recommended in the case of the connection parts 37 to provide for additional attachment of the element 5 or 6 bearing the same by means of attachment screws 31.

Figure 5:
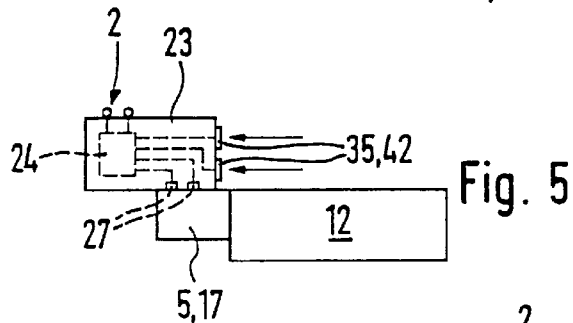
FIG. 5 shows the unit V marked in FIG. 1 in a detailed plan view.

While the electrical conductors 36 are permanently connected with the control module 23 in the case of the embodiments so far described, FIG. 5 shows a design which renders possible detachable coupling of the respective conductors 36. The two signal inputs 35 additionally present in this case are each provided with a coupling means 42. In the case of the latter it is preferably a question of a plug coupling means. The electrical conductors 36 not illustrated here in detail may accordingly be connected or removed quickly.

Similar coupling means 42 are of course also possible in the case of the signal outputs 33.

In the case of FIG. 5 the control valve 12 is a mono-stable valve so that a single valve drive 17 is sufficient for operation thereof. On such valve drive the control module 23 is mounted. If required electrical conductors coming from sensors may be detachably connected with the two vacant signal inputs 35.

Figure 7:
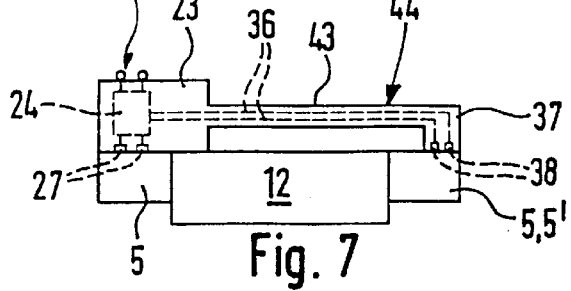
FIG. 7 shows a further advantageous design of the control means.

In FIG. 7 a design is illustrated in the case of which the control module 23 and the connection part 37 are rigidly connected together. The rigid connection is for example by way of a rib-like bridging member 43 or jumper, which may be integrally formed with the housings of the connection part 37 and of the control module 23. The electrical conductors 36 running between the connection part 37 and the control module 23 extend in the interior of the jumper member 43 and are well protected thereby. Since no flexibility is required, same may be provided in the form of printed wiring on one or more printed circuit boards, which are accommodated in the interior of the structural unit 44 made up of the control module 23, the jumper member 43 and the connection part 37. This structural unit 44 hence practically constitutes a multiple plug device, which may be installed in a single assembly operation on the associated load 5 or, respectively, sensors 6. Such arrangements are to be recommended for customized designs produced on a fair scale which do not involve any variations in connections. The control means 7 of the example may be described in connection with all actors, which are driven by electromagnetic elements. It is suitable for loads 5 and sensors 6 of different types and sizes, it being readily possible for different load or sensor types to be connected with one and the same control means 7.

Since in an arrangement as illustrated in FIG. 1 diagrammatically for example, the field bus 2 also has to be trained as far as a comparatively small number of points, installation is extremely simple. The individual control modules 23 can be connected at different points along and with the field bus in different manners. Transverse branches leading to loads 5 and, respectively, sensors 6 not directly arranged on the control modules 23 may be produced using electrical conductors 36 and the connection parts 37, the latter being able to be of the simplest possible type and more particularly not requiring any individual bus communication unit.

FIGS. 2 and 3 furthermore show an emergency shutdown core, which may be optionally provided in order to turn of individual actors in case of need. In this case the drive power should however not be supplied by way of field bus 2 but rather separately from same via the emergency shut-down core.

The electrical conductors 36 illustrated as cables may be in the form of spiral cables in order to allow for adaptation to different lengths and simple handling.

We claim:

1. A bus control device for effecting the transfer of control signals between a field bus and a plurality of sensors and/or loads, the control device including a control module comprising:
   a bus communication unit;
   means for electrically connecting said bus communication unit to the field bus;
   means for mechanically and electrically coupling said bus communication unit to one of a first load and a first sensor, said mechanical coupling means being provided upon an external surface of said control module for mounting the control module directly to one of said first load and first sensor; and
   means for electrical connection operatively coupling said bus communication unit to at least one of a second sensor and a second load remote from said first load and sensor.

2. The control device as defined by claim 1, wherein the control module further includes at least one signal input for the coupling of at least one sensor.

3. The control device as defined by claim 1, wherein the control module is a plug part.

4. The control device as defined by claim 1, wherein said means for electrical connection includes at least one electrical conductor coupled to at least one connection part external to the control module.

5. The control device as defined by claim 4, wherein each load and each sensor are respectively connected with an external connection part.

6. The control device as defined by claim 4, wherein the electrical conductor leading to each respective connection part is in the form of a flexible conductor.

7. The control device as defined by claim 6, wherein at least one connection part is rigidly connected with the control module.

8. The control device as defined by claim 6, wherein at least one connection part is a plug part.

9. The control device as defined by claim 1, wherein the means for electrical connection includes coupling means for releasably coupling the control module to at least one of a load and a sensor.

10. The control device as defined by claim 9, wherein the coupling means is a plug coupling means.

11. The control device as defined by claim 1, wherein the bus communication unit is an ASI bus station for an ASI bus.

12. The control device as defined by claim 1, wherein at least one load includes an electrically actuated valve drive.

13. The control device as defined by claim 12, further including a plurality of control valves and at least one valve drive, said plurality of control valves being collected together to form at least one subassembly.

14. The control device as defined by claim 1, wherein at least one sensor is associated with a linear drive.

15. The control device as defined by claim 1, wherein said means for electrical connection provides at least one signal input and at least one signal output.

16. The control device as defined by claim 1, wherein a plurality of control modules are present, said control modules being connectable in a selectable manner at different points along and with the field bus.

17. A control device for providing transfer of control signals between a field bus and a plurality of units which include loads and/or sensors, comprising:
   a control module including a bus communication unit, the bus communication unit being electrically coupled to a field bus; and
   at least first and second units for generating and receiving control signals, wherein each unit includes a load and/or sensor, wherein the control module is directly mounted to the first unit and electrically coupled to the bus communication for sending and receiving control signals and further wherein the control module bus communication unit is electrically coupled to the second unit for sending and receiving control signals, said second unit being arranged distant from the first unit.

* * * * *